United States Patent [19]

Hishida

[11] 4,337,405
[45] Jun. 29, 1982

[54] ELECTRIC GENERATOR

[76] Inventor: Tadashi Hishida, 2-3, 2,-cho, Kitashimizu-cho, Sakai-shi, Osaka-fu, Japan

[21] Appl. No.: 235,738

[22] Filed: Feb. 18, 1981

[30] Foreign Application Priority Data

Mar. 19, 1980 [JP] Japan ................................. 55-35986

[51] Int. Cl.³ ............................................. H02K 5/16
[52] U.S. Cl. ....................................... 310/43; 310/90; 310/152; 29/596
[58] Field of Search .................. 310/42, 43, 152, 68, 310/68 D, 90; 29/596

[56] References Cited

U.S. PATENT DOCUMENTS

| 2,861,203 | 7/1956 | Luneau et al. | 310/40 |
| 3,310,698 | 3/1967 | Krell | 310/42 |
| 3,339,096 | 8/1967 | Heiny | 310/68 R |
| 3,475,630 | 10/1969 | Heinzen et al. | 310/43 |
| 3,502,914 | 3/1970 | Cox | 310/43 |
| 4,129,796 | 12/1978 | Papst | 310/43 |

Primary Examiner—J. D. Miller
Assistant Examiner—D. L. Rebsch
Attorney, Agent, or Firm—Wenderoth, Lind & Ponack

[57] ABSTRACT

An electric generator to be mounted on an agricultural tractor or the like is proposed, in which a rotor and its related parts and a stator and its related parts are molded of plastics into integral units, respectively. The construction is much simpler than that of the conventional generators.

1 Claim, 3 Drawing Figures

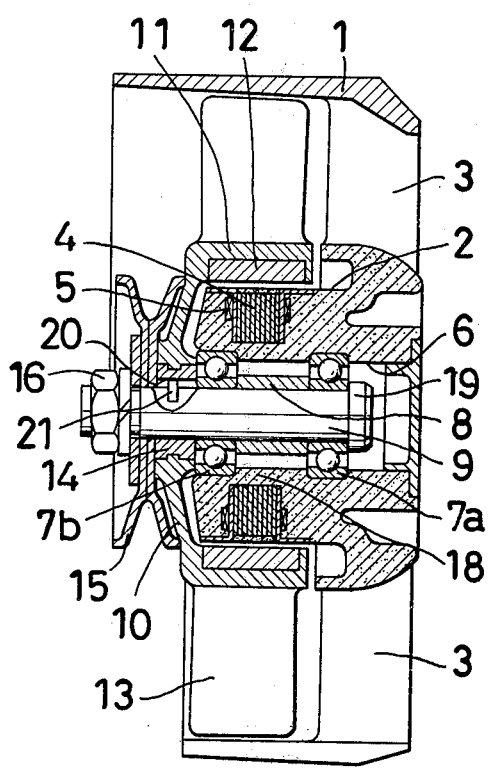
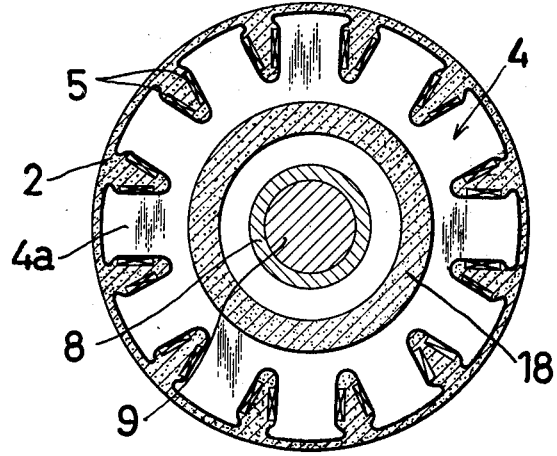
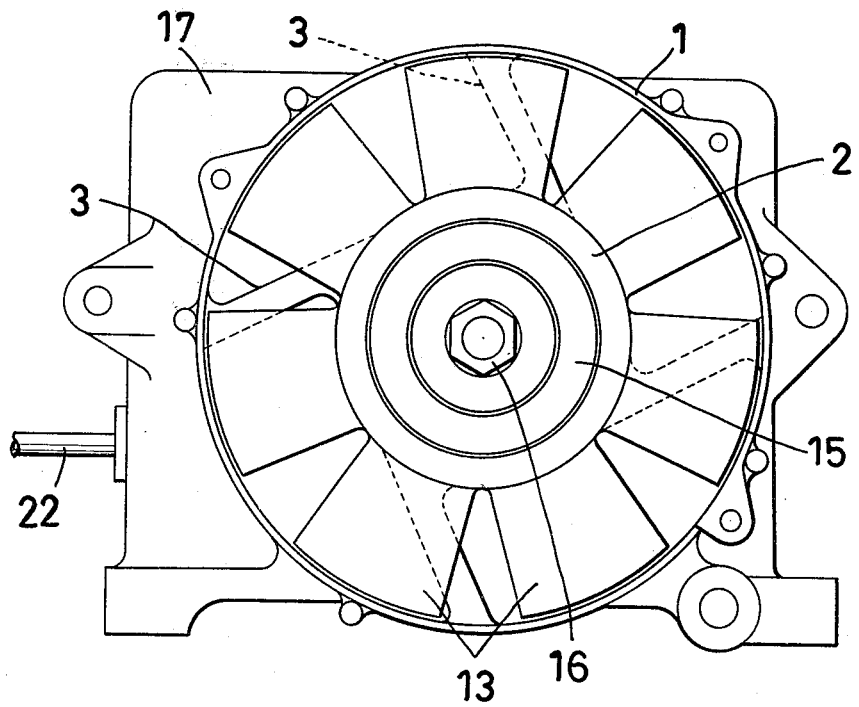

ELECTRIC GENERATOR

BACKGROUND OF THE INVENTION

The present invention relates to an electric generator, and more particularly to a multipolar generator to be mounted on a small-sized agricultural tractor or the like and characterized in that most of the parts are molded of plastics into an integral unit.

The conventional electric generator is mounted in the boss of a belt-driven cooling fan for a vehicle engine. In the alternative, the belt-driven cooling fan is secured to the shaft of the electric generator.

In the case of conventional electric generators, a stator having cores and coils are secured by cap screws to a stator frame made of die-cast aluminum. Thus, the conventional generators have a disadvantage in that the stator frame has to be machined for concentricity of its peripheral portion. Another disadvantage of the conventional generators is that, because of their intricate construction, much trouble is required for the assembling work. Still another disadvantage is that the coils are liable to be corroded by acids, ammonia or humid air.

SUMMARY OF THE INVENTION

It is an object of the present invention to provide an electric generator which obviates the above-described disadvantages.

The stator and related parts are molded integrally so that the number of parts to be assembled may be minimized and thereby the assembling work may be simplified.

With the above-described object in view and as will become apparent from the following detailed description, the present invention will be more clearly understood in connection with the accompanying drawings.

BRIEF DESCRIPTION OF THE DRAWINGS

FIG. 1 is a sectional side view of the electric generator of the present invention;

FIG. 2 is a front view thereof; and

FIG. 3 is an enlarged sectional front view of the stator.

DETAILED DESCRIPTION OF THE INVENTION

Referring now to the drawings, an electric generator of the present invention includes a cylindrical outer frame 1, a stator 2 disposed in the outer frame 1 coaxially therewith, and a plurality of arms 3 by which the stator 2 is linked to the rear end portion of the outer frame 1. The outer frame, stator and arms are molded of plastics into an integral unit. A flange 17 projects from the external surface of the outer frame 1 at substantially right angles to the axis of the outer frame 1 to provide a means for attachment to a suitable frame.

The stator 2 has an axial center hole 6. A laminated core 4 is embedded in the stator 2 coaxially with the center hole 6 with a plastic layer 18 left between the center hole 6 and the laminated core 4. In the alternative, the stator 2 may not be provided with the layer 18 so that the inner cylindrical surface of the laminated core 4 may be in alignment with the center hole 6 and that the outer diameter of the stator 2 may be reduced for the miniaturization of the generator.

A plurality of coils 5 are formed by winding an enameled wire on the pole shoes 4a radially formed on the periphery of the laminated core 4 (FIG. 3).

The outer frame 1, stator 2, and arms 3 are molded from plastics into an integral unit so that the coils 5 may be isolated from the outside air.

Two ball bearings fit in the center hole 6 of the stator. One of them, designated by the numeral 7a, is disposed in the rear part of the center hole 6. Prior to the integral molding of the outer frame 1, stator 2 and arms 3, the outer ring of the ball bearing 7a is fitted on the metal mold so that, when the integral molding is complete, the outer ring of the ball bearing 7a may be partially embedded in the inner surface of the stator 2.

Immediately after the integral molding and before the integral unit begins to contract, the other ball bearing, designated by the numeral 7b, is fitted into the front end portion of the center hole 6. As the stator 2 contracts, it tightens the ball bearing 7b and keeps it in position.

A tubular metal spacer 8 holds the two ball bearings 7a and 7b at a given distance from each other. A rotary shaft 9 having a head 19 at one end and threaded at the other end fits in the spacer 8 and the inner rings of the ball bearings 7a and 7b. Its head 19 abuts on the inner ring of the ball bearing 7a and the threaded end of the shaft 9 projects outwardly from the inner ring of the ball bearing 7b.

A drum type rotor 11 having a tapered flange 10 at its front end fits over the stator 2. The rotor 11, flange 10 and a plurality of blades 13 radially arranged on the external surface of the rotor are molded integrally of plastics. A plurality of permanent magnets 12 are secured to the internal surface of the rotor 11 so as to face the poles 5 on the stator 2. A metal bushing 14 is fixed on the shaft 9 in an opening provided in the center of the flange 10.

In order to form the above-described rotor assembly, the permanent magnets 12 and the metal bushing 14 are fitted on the metal mold prior to the integral molding of the flange 10, rotor 11 and blades 13 so that, when the integral molding has been finished, the permanent magnets 12 may be embedded in the internal surface of the rotor 11 and the plastics may flow in an annular groove provided in the external surface of the metal bushing 14 to fix the latter.

A keyway 20 is provided in the internal surface of the metal bushing 14 to receive a key 21 provided on the shaft 9. Thus, when the shaft 9 rotates, the metal bushing 14 and hence the rotor 11 will rotate therewith.

A portion of the shaft 9 projecting from the flange 10 has a square section. A V-pulley 15 has a center hole so shaped as to allow it to be mounted on this end of the shaft 9. The inner rings of the ball bearings 7a and 7b, the spacer 8, the metal bushing 14 and the pulley 15 are fastened together when a nut 16 is tightened on the threaded end of the shaft 9. Thus, when the pulley 15 rotates, the shaft 9 will rotate therewith.

A washer is put between the pulley 15 and the nut 16 to insure tightness.

The blades 13 may not be integral with the rotor 11 but form a separate unit adapted to be fixed on the rotor.

In operation, a V-belt is stretched between the pulley 15 and the shaft of an engine. When the engine is driven, the pulley 15 and hence the rotor 11 with the blade are thereby driven. The blades 13 will produce a current of air for cooling the engine. The mechanical energy of the rotor 11 is changed into electrical energy by electromagnetic induction, and the output is taken from the generator through a line 22.

The generator of the present invention is characterized by the simple structure of the stator assembly. Because the laminated core 4 and the coils 5 are embedded in the stator 2, a troublesome job of attaching the cores to the stator by cap screws as in the conventional generators is eliminated. This structure permits the stator 2 to be provided with a larger number of pole shoes than the stator of a conventional generator, even if the diameter is the same. This leads to an advantage in that an enameled wire to be wound on the pole shoes can have a larger diameter than that used in the conventional generators and consequently, a larger output can be taken from the generator with less heat loss.

The generator of the present invention has another advantage in that the possibility of corrosion of the coils 5 is precluded because they are isolated by plastics from the outside air. This advantage allows the generator of the present invention to have a longer life.

The generator of the present invention has still another advantage in that the shaft 9 and rotor 11 can be easily centered in relation to the stator 2.

The generator of the present invention has yet still another advantage in that the aforesaid way of embedding the outer rings of the ball bearings 7a and 7b in the internal surface of the stator 2 decreases the number of man-hours required for machining and assembling, and thereby reduces the manufacturing cost.

While a preferred embodiment of the present invention has been disclosed, it is to be understood that it has been described by way of example only, various other modifications being obvious.

What I claim is:

1. An electric generator comprising: a stator molded of plastic and provided with an axial center hole; a laminated core embedded in said stator coaxially therewith and having a plurality of pole shoes radially formed on an outer surface thereof; a plurality of coils formed on said pole shoes; two ball bearings disposed in said center hole of said stator, one of said two ball bearings having an outer ring by which an annular groove is formed in the cylindrical surface of said center hole of said stator coaxially therewith at the time when said stator is molded of plastic such that said outer ring remains in said annular groove after the molding of said stator, the other of said two ball bearings being fitted into one end portion of said center hole of said stator coaxially therewith; a tubular spacer for holding said two ball bearings at a given distance from each other; a rotary shaft fitting within said spacer and said two ball bearings; a rotor fitting over said stator; a plurality of permanent magnets embedded within the internal surface of said rotor; and a means for securing said rotor to said shaft.

* * * * *